Figure 1:
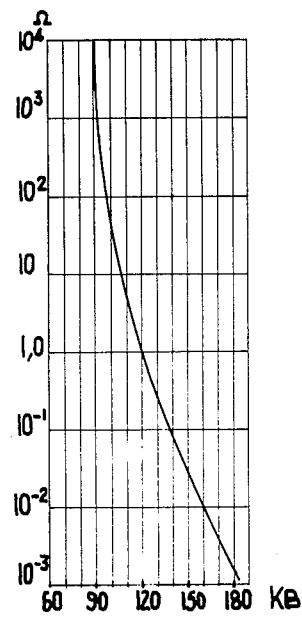

March 29, 1966  J. BERGER ETAL  3,242,718

DEVICE FOR MEASUREMENT OF PRESSURE IN EXPLOSION PHENOMENA

Filed Nov. 26, 1962  2 Sheets-Sheet 1

March 29, 1966     J. BERGER ETAL     3,242,718
DEVICE FOR MEASUREMENT OF PRESSURE IN EXPLOSION PHENOMENA
Filed Nov. 26, 1962     2 Sheets-Sheet 2

United States Patent Office 3,242,718
Patented Mar. 29, 1966

3,242,718
DEVICE FOR MEASUREMENT OF PRESSURE IN
EXPLOSION PHENOMENA
Jean Berger, Sevran, and Claude Fauquignon, Villemonble, France, assignors to Commissariat a l'Energie
Atomique, Paris, France
Filed Nov. 26, 1962, Ser. No. 239,900
Claims priority, application France, Dec. 6, 1961,
881,080
5 Claims. (Cl. 73—35)

The present invention relates to a device for the measurement of pressure, and is more especially, although not exclusively, concerned with the measurement of pressures resulting from shocks of explosive character.

It is known that measurements of pressures in explosion phenomena are made very difficult on account of particularly critical conditions of experimentation. These measurements are usually performed in a qualitative manner by comparing, for example, the mechanical effects produced on different materials of varying strengths which are disposed in proximity to the explosion. By taking into account the mechanical deformation of such materials, an approximate value of the maximum pressure resulting from the explosion can accordingly be deduced therefrom.

The purpose of the present invention is to permit of measurements which are both more accurate, more rapid and which provide for extremely simple reading of the pressure of a shock wave in a given material.

The invention has for its object a device for measurement of pressure in explosion phenomena, characterized in that it consists in means for transforming the pressure to be measured into a plurality of different pressures in known ratios, in causing each of the pressures thus obtained to produce action on an identical measuring pastille made of a material having a discontinuity in conductivity at a predetermined threshold value of pressure, in locating those pastilles whose conductivity has passed beyond the threshold of discontinuity and those pastilles whose conductivity has remained unchanged, and in deducing therefrom the pressure to be measured.

The invention is also concerned with a device comprising a reference plate made of a known material, a plurality of pressure-transforming pastilles on said reference plate, each of said pastilles being made of a different material, a measuring pastille having a discontinuity in conductivity at a predetermined threshold value of pressure in contact with each pressure transforming pastille and, inside each of said identical measuring pastilles, two electrodes connected to an indicator device located outside said measuring pastille.

The reading of results is thus very rapid since there is simply obtained an all-or-none indication and yet, by employing transformation pastilles made of materials having closely related characteristics which multiply the pressure to be measured by coefficients which are sufficiently closely adjacent while nevertheless extending over a wide range, a measurement is thus obtained which can be extremely accurate in the case of shocks of very different kinds.

Figure 2:
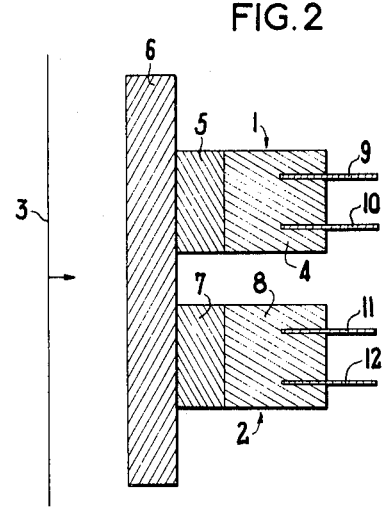
Figure 3:
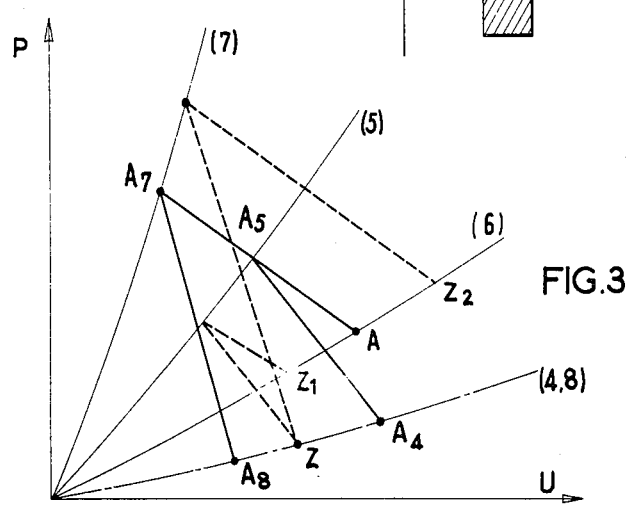
Figure 4:
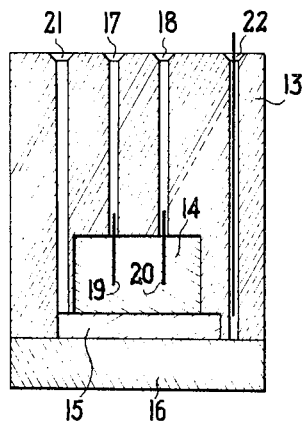
Figure 5:
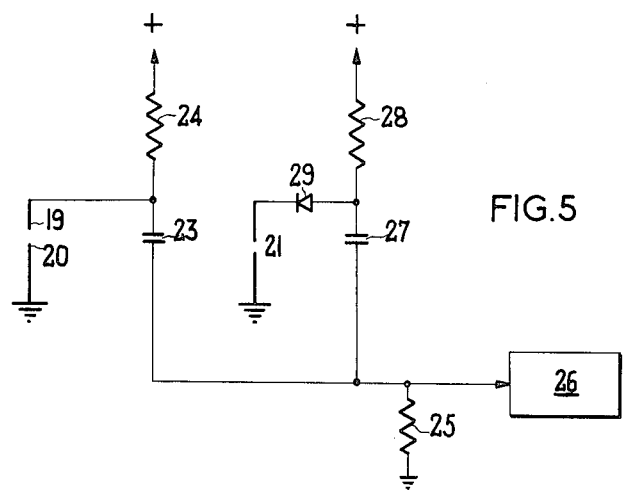

Further characteristic features and advantages of the invention will be brought out by the description which follows below, reference being made to the accompanying drawings, in which:

FIG. 1 shows the curve of variation of the electric resistance of a measuring pastille of sulphur as a function of the pressure, FIG. 2 illustrates a measuring device in accordance with the invention comprising two detector elements, FIG. 3 is a graph which is intended to explain the transformation process, FIG. 4 is an example of construction of a detector element in accordance with the invention, and FIG. 5 represents the electric circuit system which is associated with the detector element of FIG. 4.

There has been shown in FIG. 1 the curve of variation of electric resistance, expressed in ohms, of a measuring pastille of a substance such as sulphur, as a function of the pressure, in kilobars, of the shock to which the said pastille is subjected. This resistance corresponds to that which is measured between two electrodes of predetermined shape which are in good electric contact with the pastille. The scale of the ordinates is logarithmic.

It can be seen on this curve that, in the case of a given pressure of approximately ninety kilobars, the measuring pastille becomes suddenly conductive; the resistance of the measuring pastille, which is practically infinite in the case of values which are lower than this change-over threshold value then reaches relatively low values and decreases thereafter as the pressure applied increases.

The invention is based on this appearance of conductivity in a material such as sulphur, when the pressure reaches its change-over value. To this end, the pressure to be measured is transformed into a plurality of different pressures by causing the shock wave to pass through a certain number of suitable materials which are mounted together side by side and which modify the pressure of said shock wave in predetermined ratios. It is in fact well known that a change in propagation medium modifies the characteristics of the shock waves and that this modification depends on the nature of the new medium which is encountered. In addition, the shock polar or polar curve is also known which gives the corresponding values of pressures and material velocities in a solid which is subjected to a shock, in respect of a large number of materials and especially of a large number of metals.

By causing the pressure of the shock wave to produce action on pastilles of different materials having well known characteristics such as copper, lead, zinc, uranium or aluminium, for example and which are placed in a line on the path of said shock wave, the said pressure is multiplied by a series of predetermined coefficients. It is these transformed pressures which produce action on measuring pastille of a same material having a predetermined theshold of conductivity, all the measuring pastilles consequently having the same change-over pressure.

The transformation materials are chosen in such manner as to obtain a series of pressures which are uniformly distributed over a given range, so that closely adjacent pressures act upon the measuring pastilles and a certain number of said pastilles become conductive while others remain unchanged, with the result that the pressure to be measured can readily be deduced.

FIG. 2 represents a device for the practical application of this method. For the purpose of simplifying the description, it has been assumed that the said device comprises only two transformation materials, but it is manifestly apparent that the number of transformation materials depends on the measurement to be performed and especially on the accuracy which it is desired to achieve as well as the surface area subjected to equal shock intensity at a given moment.

The device of FIG. 2 is provided with two detectors 1 and 2, said detectors being placed on the path of an incident shock wave 3 which will be assumed to be a plane wave. The detector 1 is constituted in accordance with the invention by a measuring pastille 4 of a measuring material having a change-over or conductivity threshold such as sulphur, paraffin or any like appropriate substance, on the upstream side of which is placed a transformation pastille 5. The combined assembly is placed, parallel to the plane of the incident wave, on a plate 6 of a reference material such as aluminium, for example, in which it is desired to know the shock intensity. The detector 2 is placed in the same manner on the plate 6; the structure of said detector 2 differs from that of the detector 1 only in the nature of the material of which the transformation pastille 7 is made, while the measuring pastilles 4 and 8 are identical. In the interior of the measuring pastilles 4 and 8 are disposed measuring electrodes respectively designated by the reference numerals 9, 10, 11, 12 and employed for the purpose of detecting the conductivity change-over which results from the shock.

FIG. 3 is an illustration in the form of a graph showing the process of transformation of the shock wave up to the point at which this latter encounters the measuring pastille.

In this figure, the shock polars of the materials for measurement, transformation and reference have been plotted in the plane of ordinates P with abscissa U respectively denoting pressure and material velocity. The reference numerals between brackets which are assigned to these curves are those of the elements of FIG. 2.

If the shock induced by the wave 3 in the reference plate 6 is represented by the point A of the shock polar (6) of the material forming the plate 6, the co-ordinates of which represent the pressure and material velocity in said body, the point A5 representing the shock transmitted into the pastille 5 will be located both on the characteristic curve (5) of the metal which forms said pastille and on the shock polar curve (6) which is symmetrical with respect to the vertical line which passes through A since a shock is reflected into the plate 6 from the pastille 5. The same will apply in the case of the point A7 which is characteristic of the shock transmitted into the pastille 7 which will be located at the intersection of the shock polar (7) of the metal of the pastille 7 and of the polar curve (6) which is symmetrical with respect to the ordinate which passes through the point A. Similarly, the shock which is transmitted by the pastilles 5 and 7 respectively to the measuring pastilles 4 and 8 will be represented by the points A4 and A8 which will be located at the intersection of the characteristic curve (4, 8) of the material constituting the two measuring pastilles, one with the shock polar curve (5) which is symmetrical with respect to the vertical line passing through the point A5, and the other with the shock polar curve (7) which is symmetrical with respect to the vertical line which passes through A7.

If Z is the point representing the shock in the measuring material (characteristic curve (4, 8)), and the ordinate of that point is the pressure which produces the conductivity changeover of said material, a construction which is the reverse of the preceding gives two points Z1, Z2 on the shock polar (6) which represent the incident shocks in the reference material, and at which occurs the changeover of the detectors 1 and 2 respectively.

It can be seen that the point A4 is located above the point Z and the point A8 is located below the point Z, with the result that the shock A will produce the conduction of the measuring pastille 4, whereas between the electrodes 11 and 12, the resistance will be practically infinite. It can be stated in equivalent terms that this results from the fact that the point A which represents the incident shock in the reference plate 6 is located above the point Z1 and below the point Z2, while the ordinates of these points can be referred-to as thresholds which are carried back from the detectors 1 and 2 to the level of the reference plate 6.

It can be seen that it possible to generalize this construction by making use of transformation materials which are judiciously selected in such manner as to reduce the intervals between the thresholds carried back from the various detectors while at the same time covering a wide range of pressures.

It has been assumed in the foregoing that the detector elements 1, 2, etc., were placed on a same reference plate. In point of fact, for reasons of a technological order and in order to ensure substantial flexibility of use, separate circuits are built which are mounted on reference plates of the same nature.

FIG. 4 illustrates in detail, by way of example, a detector element which is fitted with its reference plate. This detector comprises a cylindrical body 13 which is employed for the purpose of assembling together the various members which make up the detector and in which are formed cylindrical recesses intended for the purpose of placing therein a measuring pastille 14 made of a conductivity-threshold material such as sulphur, for example, and a transformation pastille 15. A plate 16 of a reference material such as aluminium forms the cover, which is secured to the body by means not illustrated in the drawing and which ensures at the same time that the pastille 15 and measuring pastille 14 are firmly secured together. The body 13 is pierced with two longitudinal passages 17, 18 which provide a passageway for the measuring electrodes 19, 20, these latter being fixed in the center of the measuring pastille 14. The said electrodes are connected to an electric circuit system which will be described below and which is designed to transform the variation in conductivity of the pastille 14 into an electric impulse which is visible, for example, on the screen of an oscilloscope.

It has been found necessary to take certain precautionary steps owing to the conditions of measurement. In point of fact, under the action of the incident shock, the transformation pastille 15, which is usually of metal, can in certain cases move at a velocity which is greater than that of the electrodes 19 and 20 and thus short circuit these latter; in this case, the indication exhibited by the oscilloscope would obviously be misleading. In order to eliminate this ambiguity, a contact probe is placed between the measuring pastille 14 and the transformation pastille 15 and has the function of recording on the oscillogram a reference impulse by means of which the time of induction of the wave in the material 14 can be detected; the observation of the time interval which elapses between the reference impulse and the conduction signal accordingly makes it possible to dispel any uncertainty. There is shown in FIG. 4 the transverse passage 21 through which the said contact probe can be inserted (the probe being made up, for example, of two adjacent wires which come into contact as the wave passes). Another contact probe 22 has been inserted between the reference plate 16 and the transformation pastille 15 so as to trigger the oscilloscope.

FIG. 5 shows the electric circuit system which is associated with the detector of FIG. 4.

In this figure, the two measuring electrodes 19 and 20 are in one case connected to earth (ground) and in the other case connected to a conventional circuit comprising a capacitor 23, one plate of which is connected to a voltage source through a resistor 24, while the other plate is connected to earth (ground) through a resistor 25 into which the capacitor 23 discharges when the space between the electrodes 19 and 20 is made conductive. The voltage which is developed across the terminals of the resistor 25 is then applied to the input of an oscilloscope 26. The circuit which is associated with the contact probe of the passage 21 of FIG. 4 is connected in parallel with the resistor 25, and is composed of the same elements as the electrode circuit, that is to say, of a capacitor 27 which is charged by a voltage source through a resistor 28; a diode 29 prevents the capacitor 23 from discharging through the capacitor 27 when the probe 21 is in short circuit. There has not been illustrated in the figure the oscilloscope trigger circuit which is associated with the probe 22, and which is of conventional type.

It can be understood from the foregoing that it is merely necessary to make provision for a series of identical systems consisting of detectors of a type similar to that of FIG. 4 and associated with circuits such as that of FIG. 5 in order to produce a device which can be referred to as a shock manometer; only the materials which go to make up the transformation pastilles 15 will be different. The detectors will be arranged side by side, for example, in such manner that the shock intensity induced in their reference plates 16 will be the same. The measurement will be taken by identifying those detectors which correspond to the highest change-over threshold value among those which have produced a conduction impulse and among those which have not reacted. The pressure of the wave in the reference plate or pressure to be measured is comprised between these two threshold values. By selecting transformation materials which have closely adjacent characteristics, there is thus obtained a rapid measurement which can be extremely accurate.

It will be understood that the invention is not in any sense limited to the form of embodiment which has been described and illustrated and which has been given solely by way of example.

What we claim is:

1. Pressure measuring device of pressures in explosion phenomena characterized in that said device comprises a reference plate made of a known material, a plurality of pressure-transforming pastilles on said reference plate, each of said pastilles being made of a different material that transforms the pressure being measured into a different pressure than the other pastilles of a known ratio with the pressure to be measured, a measuring pastille having a discontinuity of conductivity at a predetermined threshold value of pressure in contact with each pressure transforming pastille, all of the measuring pastilles being identical, and two electrodes secured inside each of said measuring pastilles and connected to said measuring pastille and connected to an indicator device located outside said measuring pastille for indicating the measuring pastille whose conductivity has passed beyond the threshold of discontinuity and those whose conductivity has remained unchanged.

2. Device in accordance with claim 1, characterized in that the said device comprises on the reference plate a plurality of cylindrical bodies each holding a pressure transforming pastille and a measuring pastille against said reference plate, each cylindrical body being pierced with conduits providing passageways for the conductors which connect the electrodes to the indicator device.

3. Device in accordance with claim 2, characterized in that said device comprises in each cylindrical body a probe for the purpose of controlling the compact between the reference plate and the pressure transforming pastille.

4. Device in accordance with claim 2, characterized in that said device comprises in each cylindrical body a probe for the purpose of controlling the contact between the pressure transforming pastille and the measuring pastille.

5. Pressure measuring device, characterized in that said device comprises a plurality of identical reference plates, a pressure transformation pastille on each of said plates, each of said pastilles being made of a different material that transforms the pressure being measured into a different pressure than the other pastilles of a known ratio with the pressure to be measured, a measuring pastille having a discontinuity in conductivity at a pre-determined threshold value of a pressure in contact with each pressure transforming pastille and, in each of said measuring pastilles, two electrodes connected to an indicator device located outside said measuring pastille for indicating the measuring pastille whose conductivity has passed beyond the threshold of discontinuity and those whose conductivity has remained unchanged.

References Cited by the Examiner
UNITED STATES PATENTS

| 1,986,479 | 1/1935 | Lowe et al. | 340—236 X |
| 2,735,081 | 2/1956 | Hosford | 340—236 X |
| 2,929,885 | 3/1960 | Mueller | 73—88.5 |

RICHARD C. QUEISSER, *Primary Examiner.*

DAVID SCHONBERG, E. KARLSEN, J. J. GILL,
*Assistant Examiners.*